UNITED STATES PATENT OFFICE 2,533,240

ORGANOCHLOROSILANES AND PROCESS FOR THEIR PRODUCTION

Leo A. Goldblatt and Dorothy M. Oldroyd, New Orleans, La., assignors to the United States of America as represented by the Secretary of Agriculture No Drawing. Application January 16, 1948, Serial No. 2,798

14 Claims. (Cl. 260—448.2)

(Granted under the act of March 3, 1883, as amended April 30, 1928; 370 O. G. 757)

This application is made under the act of March 3, 1883, as amended by the act of April 30, 1928, and the invention herein described and claimed if patented in any country, may be manufactured and used by or for the Government of the United States of America throughout the world for governmental purposes without the payment to us of any royalty thereon.

This invention relates to reaction products of olefinic terpene hydrocarbons, which may have substituents, with halo-silicon hydrides. It particularly relates to addition products, or adducts, of terpene hydrocarbons with halo-silanes, having the linkage —SiH.

The adducts are addition compounds of one or more whole molecules of the halosilane with one or more whole molecules of the terpene, such as, for example, the adducts corresponding to the formulas $C_{10}H_{16}.SiHCl_3$; and $C_{10}H_{16}.CH_3SiHCl_2$, in which $C_{10}H_{16}$ represents the beta-pinene, alpha-pinene, camphene, and dipentene (limonene) moiety.

An object of this invention is the preparation of new addition compounds of terpenes and halo-silicon hydrides having numerous uses in the arts, in conferring water-repellency and in the preparation of useful polymers, for example.

A further object of this invention is to prepare new adducts of terpene hydrocarbons with chlorosilanes and other halo-silanes having the linkage —SiH.

Another object is to convert the reaction or addition products by hydrolysis and polymerization into products useful in the arts, for example, as bonding, sealing, or plasticizing agents.

Products of this invention are useful in making surfaces water repellent. A glass container in which these compounds or a solution of these compounds in a suitable solvent have been stored becomes coated with a submicroscopic film which is water repellent. Filter paper or cloth exposed to vapors of these products is no longer wetted by water. The addition products were hydrolyzed by water and the hydrolytic products polymerized to oily, resinous, or spongy rubber-like products. Such hydrolyzed and polymerized products may be used as sealing compositions, bonding agents, protective coatings, or to produce molded products and may be mixed or compounded with suitable fillers, plasticizers or other materials, such as, asbestos, talc, bentonite, wood flour, or with natural or synthetic resins such as rubber, asphalt, pitch, shellac and cellulose.

The reaction is preferably carried out in the presence of catalysts, such as organic peroxides. Benzoyl peroxide and diacetyl peroxide are preferred. The acetyl peroxide may be either in the pure crystalline form or in 30% solution in dimethyl phthalate. Other activating agents may be present, such as ultraviolet light. Oxygen of the air does not affect the reaction and it is not necessary to displace the air with an inert atmosphere.

Among the halo-silanes to which our process is applicable are the compounds $HSiCl_3$ and $CH_3SiHCl_2$, known as trichlorosilane and methyl dichlorosilane.

The reaction is applicable to a wide variety of terpenes having at least one non-aromatic double bond, for instance, to alpha and beta pinene, camphene and dipentene, which are cyclic terpenes having an olefinic or non-aromatic double bond.

The following specific examples are illustrative only, and may be applied to other halosilanes and other terpenes having an olefinic double bond, that is, a non-aromatic double bond.

Example 1

41 g. beta-pinene (0.3 mole) and 41 g. trichlorosilane, (0.3 mole) and 2.4 g. benzoyl peroxide (0.01 mole) were mixed together and refluxed on a steam bath under a pressure of 20 cm. of mercury above atmospheric pressure for a period of 5 hours. During this time the temperature rose from 68° to 96° C. The reaction product was then fractionally distilled, first at atmospheric pressure to remove unreacted silane then at 20 mm. pressure to remove unreacted beta-pinene and finally at 2 mm. pressure to recover the addition product. In this way there was obtained 17 g. silane, 15 g. beta-pinene and 40 g. of crude addition product boiling chiefly at 95° C. at 2 mm. pressure. On redistillation of the addition product through a short Vigreaux column a heart cut was found to have a density of 1.15 g./ml. and to contain 9.7% silicon.

Example 2

A mixture of 68 g. beta-pinene (0.5 mole) and 115 g. methyldichlorsilane (1.0 mole) and 2.4 g. crystalline acetyl peroxide (0.02 mole) was refluxed under a pressure of 20 cm. of mercury above atmospheric pressure for a period of 4 hours. During this time the temperature gradually rose from 55 to 76° C. On distillation as in Example 1 there was obtained 40 g. of addition product boiling chiefly at 110° C. at 8 mm. pressure. On redistillation of the addition product through a short Vigreaux column, a heart cut was found to have a density of 1.05 g./ml. and to contain 10.1% silicon.

*Example 3*

A mixture of 54 g. trichlorosilane (0.4 mole), 54 g. alpha-pinene (0.4 mole) and 5 g. of a 30% solution of acetyl peroxide in dimethyl phthalate was refluxed on a steam bath under a pressure of 20 cm. of mercury above atmospheric pressure for a period of 4 hours. During this time the temperature rose from 69° to 94° C. The reaction product was then fractionally distilled as in Example 1. There was thus obtained 60 g. of crude addition product boiling chiefly at 101° C. at 1 mm. On redistillation of the addition product through a short Vigreaux column the heart cut was found to have a density of 1.17 g./ml. and to contain 8.9% silicon.

*Example 4*

A mixture of 27 g. alpha-pinene (0.2 mole), 23 g. methyldichlorosilane (0.2 mole) and 5 g. of a 30% solution of acetyl peroxide in dimethylphthalate were refluxed at atmospheric pressure on a steam bath for a period of 7 hours. During this time the temperature rose from 76 to 89° C. The reaction product was then distilled as in Example 1. There was thus obtained 9 g. of addition product boiling chiefly at 104° at 1 mm. pressure.

*Example 5*

A mixture of 41 g. trichlorosilane (0.3 mole), 41 g. camphene (0.3 mole) and 4 g. of a 30% solution of acetyl peroxide in dimethyl phthalate was refluxed on a steam bath under a pressure of 20 cm. of mercury above atmospheric pressure. After 2 hours an additional 4 g. of the acetyl peroxide solution was added and refluxing was continued for a total of 4½ hours. During this time the temperature rose from 67° to 88° C. The reaction product was then distilled as in Example 1. There was thus obtained 18 g. of addition product boiling chiefly at 104° at 4 mm. pressure. On redistillation of the addition product through a short Vigreaux column the heart cut was found to have a density of 1.18 g./ml. and to contain 7.8% silicon.

*Example 6*

A mixture of 54 g. trichlorosilane (0.4 mole) and 54 g. dipentene (0.4 mole) and 5 g. of a 30% solution of acetyl peroxide in dimethyl phthalate was refluxed on a steam bath under a pressure of 20 cm. of mercury above atmospheric pressure. The reaction product was then fractionally distilled as in Example 1. There was thus obtained 41 g. of addition product boiling chiefly at 98° at 2 mm. pressure. On redistillation of the addition product through a short Vigreaux column the heart cut was found to have a density of 1.17 g./ml. and to contain 7.4% silicon.

Further purification, by methods familiar to the art, may be used, such as, for example, fractional distillation at high vacuum or at atmospheric pressure, or by solvent extraction, or by a combination of these methods.

It is within the purview of this invention to substitute corresponding iodo, bromo, and fluoro compounds for the chlorosilanes. The methyl group, in the methyl dichlorosilane, is unaffected in the reaction. The processes described in the examples are applicable to chlorosilanes having other organic substituents, such as ethyl, propyl, and aryl groups, for example, phenyl and substituted phenyl and alkyl radicals, and others.

Having thus described our invention, we claim:

1. A process comprising refluxing a mixture of a halo-silicon hydride, taken from the group consisting of tri-chloro-silicon hydride and methyl-dichloro-silicon hydride, with a cyclic terpene hydrocarbon having at least one non-aromatic double bond of the formula $C_{10}H_{16}$, at about 55° to 96° C. for several hours in the presence of an organic peroxide catalyst, and fractionally distilling the reaction mixture to recover a reaction product of the halo-silicon hydride and said terpene having a silicon content of at least about 7.4%.

2. A process comprising refluxing a mixture of pinene and a chloro-silicon hydride taken from the group consisting of tri-chloro-silicon hydride and methyl-dichloro-silicon hydride at a temperature of about 55° to 96° C. for several hours in the presence of an organic peroxide, and then fractionally distilling the reaction mixture to recover a reaction product of the pinene and the chloro-silicon hydride.

3. The process described in claim 1 in which the terpene is taken from the group consisting of alpha-pinene, beta-pinene, camphene, and dipentene.

4. A process comprising refluxing a mixture of beta-pinene and trichlorosilane in the presence of benzoyl peroxide, at about 68° to 96° C. for several hours, and fractionally distilling the product to recover a reaction product of beta-pinene and trichlorosilane containing about 9.7% silicon.

5. A process comprising refluxing a mixture of beta-pinene and methyldichlorosilane in the presence of acetyl peroxide at about 55 to 76° C., and fractionally distilling the product to recover a reaction product of beta-pinene and methyldichlorosilane containing about 10.1% silicon.

6. A process comprising refluxing a mixture of alpha-pinene with tricholorsilane in the presence of acetyl peroxide at about 69 to 94° C., and fractionally distilling the product to recover a reaction product of alpha-pinene and trichlorosilane containing about 8.9% silicon.

7. A reaction product of a cyclic terpene hydrocarbon having at least one non-aromatic bond of the formula $C_{10}H_{16}$ and a compound taken from the group consisting of unsubstituted halo-silicon hydride and halo-silicon hydride substituted by lower alkyl hydrocarbon only, prepared by refluxing the terpene hydrocarbon and the halo-silicon hydride in the presence of an organic peroxide catalyst at 55° to 96° C.

8. The reaction product of claim 7 in which the terpene is taken from the group consisting of alpha-pinene, beta-pinene, camphene, and dipentene, and the halo-silicon hydride is taken from the group consisting of tri-chloro silicon hydride and methyl dichloro-silicon hydride, the product having a silicon content of at least about 7.4%.

9. A reaction product of pinene and a compound taken from the group consisting of tri-chloro-silicon hydride and methyl-dichloro-silicon hydride, prepared by refluxing the pinene and the chloro-silicon hydride in the presence of an organic peroxide catalyst, and separating a product having at least about 8.9% silicon content.

10. A reaction product of pinene and a compound taken from the group consisting of unsubstituted halo-silicon hydride and halo-silicon hydride substituted by lower alkyl hydrocarbon only, prepared by refluxing the pinene and the halo-silicon hydride in the presence of an organic peroxide catalyst at about 55° to 96° C. for several hours.

11. The reaction product of trichloro-silicon hydride and camphene prepared by refluxing the silicon hydride and the camphene in the presence of acetyl peroxide at about 67° to 88° C.

12. The reaction product of trichloro-silicon hydride and beta-pinene prepared by refluxing the silicon hydride and beta-pinene in the presence of benzoyl peroxide at about 68° to 96° C. and separating the reaction product having about 9.7% silicon content.

13. The reaction product of methyl-dichloro-silicon hydride and beta-pinene, prepared by refluxing the silicon hydride and beta-pinene in the presence of acetyl peroxide at about 55° to 76° C. and separating the reaction product containing about 10.1% silicon.

14. The reaction product of tri-chloro-silicon hydride and alpha-pinene, prepared by refluxing the hydride and alpha-pinene in the presence of acetyl peroxide at 69° to 94° C., and separating the product containing about 8.9% silicon.

LEO A. GOLDBLATT.
DOROTHY M. OLDROYD.

REFERENCES CITED

The following references are of record in the file of this patent:

UNITED STATES PATENTS

| Number | Name | Date |
| --- | --- | --- |
| 2,379,821 | Miller | July 3, 1945 |
| 2,405,619 | Dalin | July 30, 1946 |
| 2,407,181 | Scott | Sept. 3, 1946 |
| 2,443,898 | Ellingboe | June 22, 1948 |

OTHER REFERENCES

Sommer, "J.A.C.S.," vol. 69 (1947), page 188.
Barry, "J.A.C.S.," vol. 69 (1947), page 2916.
Pietrusza, "J.A.C.S.," vol. 70 (1948) pages 484-486.